United States Patent
Rambo et al.

(10) Patent No.: US 11,477,227 B1
(45) Date of Patent: Oct. 18, 2022

(54) ENTERPRISE SECURITY MEASURES

(71) Applicant: Wells Fargo Bank, N.A., San Francisco, CA (US)

(72) Inventors: Douglas C. Rambo, Davidson, NC (US); Steven M. Trudeau, Advance, NC (US); Titanya Hughes, Charlotte, NC (US); Michael Colehouse, Shoreview, MN (US); Timothy J. Calabro, Brooklyn, NY (US); Vincent N. Nguyen, Minneapolis, MN (US); Ben D. Brenden, Eau Claire, WI (US)

(73) Assignee: WELLS FARGO BANK, N.A., San Francisco, CA (US)

( * ) Notice: Subject to any disclaimer, the term of this patent is extended or adjusted under 35 U.S.C. 154(b) by 128 days.

(21) Appl. No.: 16/699,879

(22) Filed: Dec. 2, 2019

Related U.S. Application Data

(63) Continuation of application No. 16/107,461, filed on Aug. 21, 2018, now Pat. No. 10,523,700, which is a
(Continued)

(51) Int. Cl.
| | | |
|---|---|---|
| *H04L 9/40* | (2022.01) | |
| *G06F 8/65* | (2018.01) | |
| *G06F 21/50* | (2013.01) | |
| *G06F 21/57* | (2013.01) | |
| *G06F 16/2457* | (2019.01) | |

(52) U.S. Cl.
CPC ............ *H04L 63/1433* (2013.01); *G06F 8/65* (2013.01); *G06F 16/24578* (2019.01); *G06F 21/50* (2013.01); *G06F 21/577* (2013.01); *H04L 63/1441* (2013.01)

(58) Field of Classification Search
CPC ..... G06F 8/65; G06F 8/67; G06F 8/60; G06F 21/554; G06F 21/577; G06F 21/55; G06F 21/57; G06F 11/1433; H04L 63/1433; H04L 63/1441; H04L 63/20; H04L 67/34; H04L 41/0873
See application file for complete search history.

(56) References Cited

U.S. PATENT DOCUMENTS

| | | | |
|---|---|---|---|
| 8,132,260 B1 * | 3/2012 | Mayer | H04L 67/125 726/25 |
| 8,136,163 B2 | 3/2012 | Birt et al. | |

(Continued)

OTHER PUBLICATIONS

J. H. Graham et al., "Computer System Security Threat Evaluation Based Upon Artificial Immunity Model and Fuzzy Logic," Engineering Village Inspec:Technical Literature Search, Published in 2005 IEEE International Conference on Systems, Man and Cybernetics (vol. 2), Oct. 12, 2005, pp. 1297-1302.

(Continued)

*Primary Examiner* — Tae K Kim
(74) *Attorney, Agent, or Firm* — Merchant & Gould P.C.

(57) ABSTRACT

A system for managing security within an enterprise includes a computing device that receives a vulnerability, generates a user score for each user within the enterprise and generates a threat score for the vulnerability. A user device score may also be generated for each device associated with a user. Based on the user score and the threat score, a composite score is generated. After acquiring a security measure, the security measure is implemented based on the composite score and, at times, the user score.

20 Claims, 7 Drawing Sheets

Related U.S. Application Data continuation of application No. 15/148,766, filed on May 6, 2016, now Pat. No. 10,084,809.

(56) References Cited

U.S. PATENT DOCUMENTS

| | | | | |
|---|---|---|---|---|
| 8,479,297 | B1* | 7/2013 | Edukulla | H04L 63/1433 |
| | | | | 713/188 |
| 8,484,741 | B1 | 7/2013 | Chapman | |
| 8,495,747 | B1* | 7/2013 | Nakawatase | G06F 21/577 |
| | | | | 726/25 |
| 8,533,844 | B2 | 9/2013 | Mahaffey et al. | |
| 8,544,098 | B2 | 9/2013 | Gustave et al. | |
| 8,595,844 | B2 | 11/2013 | Bahl | |
| 8,776,168 | B1* | 7/2014 | Gibson | H04L 63/102 |
| | | | | 709/225 |
| 8,776,180 | B2 | 7/2014 | Kumar et al. | |
| 8,831,972 | B2 | 9/2014 | Angell et al. | |
| 8,832,832 | B1 | 9/2014 | Visbal | |
| 8,984,643 | B1* | 3/2015 | Krisher | H04L 63/1408 |
| | | | | 726/25 |
| 9,021,595 | B2 | 4/2015 | Schrecker et al. | |
| 9,032,533 | B2 | 5/2015 | Bennett et al. | |
| 9,058,486 | B2 | 6/2015 | Moyle et al. | |
| 9,118,711 | B2 | 8/2015 | Oliphant et al. | |
| 9,119,017 | B2 | 8/2015 | Sinha | |
| 9,275,231 | B1* | 3/2016 | Chen | G06F 21/564 |
| 9,710,253 | B2* | 7/2017 | Bansod | G06F 8/65 |
| 10,409,579 | B1* | 9/2019 | Morris | H04L 67/34 |
| 2004/0003286 | A1* | 1/2004 | Kaler | G06F 21/554 |
| | | | | 726/25 |
| 2005/0044418 | A1* | 2/2005 | Miliefsky | H04L 63/0272 |
| | | | | 726/4 |
| 2005/0091651 | A1* | 4/2005 | Curtis | G06F 8/65 |
| | | | | 717/174 |
| 2006/0020814 | A1* | 1/2006 | Lieblich | H04L 63/1425 |
| | | | | 713/182 |
| 2006/0217111 | A1* | 9/2006 | Marolia | H04M 3/42178 |
| | | | | 186/35 |
| 2007/0094735 | A1* | 4/2007 | Cohen | H04L 63/168 |
| | | | | 713/188 |
| 2007/0143851 | A1* | 6/2007 | Nicodemus | G06F 21/577 |
| | | | | 726/4 |
| 2008/0288330 | A1* | 11/2008 | Hildebrand | G06Q 10/06398 |
| | | | | 705/7.42 |
| 2009/0024663 | A1* | 1/2009 | McGovern | G06F 21/577 |
| 2010/0281543 | A1* | 11/2010 | Golomb | H04L 63/1433 |
| | | | | 726/25 |
| 2012/0159142 | A1* | 6/2012 | Jibbe | G06F 8/71 |
| | | | | 713/100 |
| 2012/0268269 | A1* | 10/2012 | Doyle | G08B 21/22 |
| | | | | 340/539.13 |
| 2013/0097701 | A1* | 4/2013 | Moyle | H04L 63/20 |
| | | | | 726/22 |
| 2013/0097709 | A1* | 4/2013 | Basavapatna | H04L 63/20 |
| | | | | 726/25 |
| 2013/0198840 | A1* | 8/2013 | Drissi | G06F 21/552 |
| | | | | 726/22 |
| 2013/0239177 | A1 | 9/2013 | Sigurdson et al. | |
| 2014/0007179 | A1 | 1/2014 | Moore | |
| 2014/0173738 | A1* | 6/2014 | Condry | G06F 21/577 |
| | | | | 726/25 |
| 2014/0331277 | A1* | 11/2014 | Frascadore | G06F 21/577 |
| | | | | 726/1 |
| 2014/0337982 | A1* | 11/2014 | Crosby | H04L 63/1433 |
| | | | | 726/25 |
| 2015/0242637 | A1 | 8/2015 | Tonn et al. | |
| 2015/0319185 | A1* | 11/2015 | Kirti | H04L 67/306 |
| | | | | 726/23 |
| 2016/0088021 | A1* | 3/2016 | Jayanti Venkata | G06F 21/45 |
| | | | | 726/1 |
| 2016/0099972 | A1* | 4/2016 | Qureshi | G06F 21/6218 |
| | | | | 726/1 |

OTHER PUBLICATIONS

Teresa F. Lunt, "Ides: an intelligent system for detecting intruders," http://www.researchgate.net/profile/Teresa_Lunt/publication/242383334_Ides_an_intelligent_system_for_detecting_intruders/links/552dacae0cf29b22c9c4f95f.pdf, Published in the Proceedings of the Symposium: Computer Security, Threat and Countermeasures, Rome, Italy, Nov. 1990, 12 pages.

Younis, Awad, et al., "Assessing vulnerability exploitability risk using software properties," Software Quality Journal, Mar. 2016, vol. 24, Issue 1, pp. 159-202.

* cited by examiner

ENTERPRISE SECURITY MEASURES

BACKGROUND

Security risks, such as software vulnerabilities, often necessitate revisions to improve or modify existing software. Some enterprises address software vulnerabilities by issuing patches. Patches are used in mobile computing environments, such as smart phones, as well as in stationary computing components, such as desktop computing devices in an enterprise. Oftentimes, many devices within an enterprise will need to be updated to address a given security risk.

SUMMARY

Embodiments of the disclosure are directed to a system for managing security risks to user devices within an enterprise. In one aspect, an electronic computing device includes a processing unit and system memory including instructions. The instructions, when executed by the processing unit, cause the electronic computing device to: receive a vulnerability, generate a user score for each of a plurality of users within an enterprise, and generate a threat score for the vulnerability. The user score is generated based on a set of characteristics including: behavioral data, user device data, and user status data. Based on the user score and the threat score, a composite score is generated. Based on the composite score, a security measure is implemented.

In another aspect, a computer-implemented method is disclosed. The method includes receiving a vulnerability, generating a user score for each of a plurality of users within an enterprise, and generating a threat score for the vulnerability. The threat score is generated based on a third party vulnerability score and an internal vulnerability score. Based on the user score and the threat score, a composite score is generated. The method also includes generating a user rank using the user score generated for each of the plurality of users, receiving a security measure, and, based on the composite score and the user rank, implementing the security measure.

In yet another aspect, a system for managing security within an enterprise includes a computer-readable, non-transitory data storage memory comprising instructions. The instructions, when executed by a processing unit of an electronic computing device, cause the processing unit to: receive a vulnerability, generate a user device score for each of a plurality of user devices within the enterprise based on user device data, and generate a threat score for the vulnerability, wherein the threat score is generated based on a third party vulnerability score and an internal vulnerability score. The user device data includes at least one of: a type of a user device and a type of data processes used by the user device. The instructions also cause the processing unit to, based on the user device score and the threat score, generate a composite score, generate a user score for each of a plurality of users within the enterprise, generate a user rank using the user score, acquire a security measure, and implement the security measure based on the composite score and the user rank. The user score is generated based on a set of characteristics including: behavioral data and user status data, the behavioral data include behavioral patterns and access patterns, and the user status data includes at least one of: a corporate rank of a user and a system access level for the user.

The details of one or more embodiments are set forth in the accompanying drawings and the description below.

Other features, objects, and advantages of these embodiments will be apparent from the description, drawings, and claims.

DESCRIPTION OF THE DRAWINGS

The following drawing figures, which form a part of this application, are illustrative of described technology and are not meant to limit the scope of the disclosure as claimed in any manner, which scope shall be based on the claims appended hereto.

DETAILED DESCRIPTION

Figure 1:
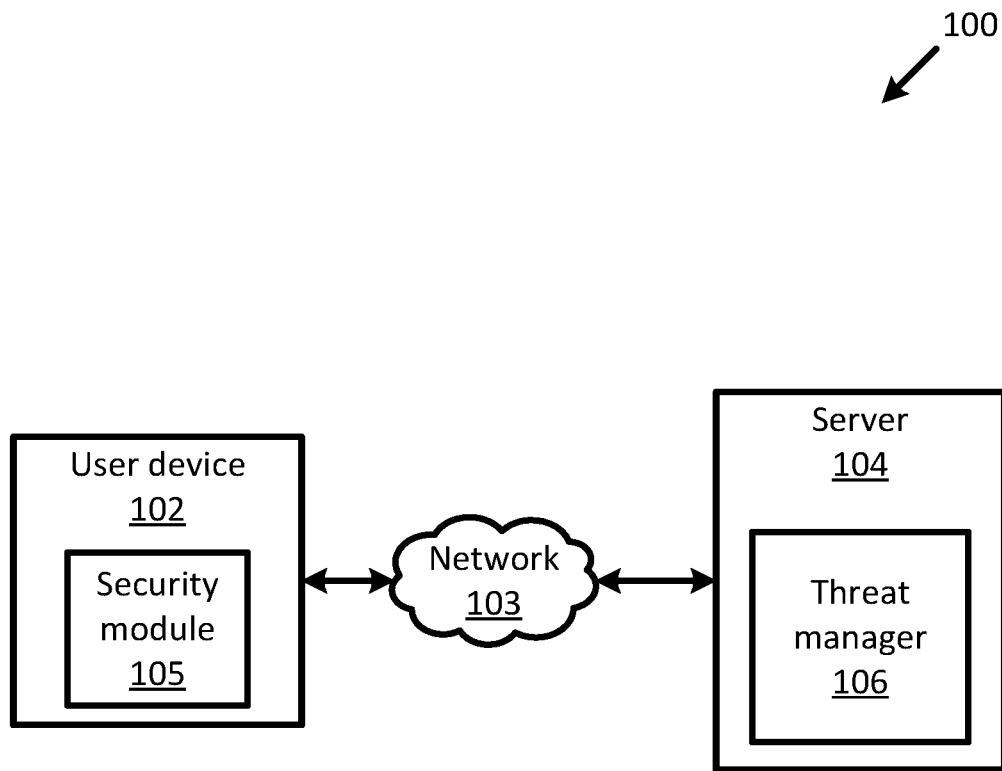
FIG. 1 is a schematic view of an example computing system for managing security in an enterprise.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Broadly, the present disclosure is directed to a system for managing security risks to user devices within an enterprise. Security risks may be threats identified by the enterprise or by a third party. Security risks include vulnerabilities and weaknesses of, for example, operating systems, firmware, particular software applications, and the like. That is, the vulnerabilities may be found in code, design, or architecture of the user devices. The security risks may be publicly known or privately identified by personnel within the enterprise.

Depending on the nature and sophistication of the threat, the user devices may be vulnerable to malicious actors capable of compromising sensitive or confidential data of the user and the enterprise. Different users within an enterprise may have different priorities for remedying the security risks, such as a chief operating officer (CEO) with access to all sensitive data of the enterprise versus a line worker with limited data access and/or security clearance.

As patches or other remedies to a given vulnerability are generated, they are distributed to the user devices affected by the vulnerability. Especially in large organizations, these patches and/or other remedies cannot be simultaneously rolled out to every user device. One reason is the expected demands on the enterprises information technology (IT) personnel in fielding communication from users within the enterprise. That is, for a given patch an enterprise may expect about 10% of the affected users to contact the IT personnel with questions or troubleshooting needs. The IT personnel may not be able to handle more than a few communications each per hour, thus the patch rollout is metered across the enterprise.

Additionally, it may be desirable to prioritize patching the users and/or user devices with the most sensitive data and/or data access before patching user devices with lesser access. That is, some users may have clearance within the enterprise to access certain data, but one or more of their devices are not capable of accessing those data. Thus, the devices used by a particular user can have different priorities for patching.

Additionally, prioritizing the patch or other remedy roll out such that every user device is not simultaneously updated improves, for example, the transactional efficiency of an enterprise's computers, saves memory usage, and reduces the quantity of computations performed by the enterprise's computers.

FIG. 1 illustrates a schematic diagram of an embodiment of an example system 100 in which security risks and/or vulnerabilities are managed. The example system 100 includes a user device 102 in communication with a server via network 103. The server 104 hosts threat manager 106. Other embodiments may include more or fewer components.

User device 102 is a computing device associated with a user in an enterprise. For a given user, there may be multiple user devices 102 associated with that user. For example, a user may be associated with a smart phone, a laptop computer, and a desktop computer. The user device may be corporate-owned or owned by the user. Other types of user devices 102 are possible.

Generally, a user device 102 is a computing device that is capable of accessing some enterprise-related data, such as email, networked hard drives, intranet sites, and enterprise-specific computing applications. User device 102 includes generally the components of example computing device shown and described with reference to FIG. 7, below.

In embodiments, user device 102 includes a security module 105 stored on the memory. As discussed below in more detail, this security module 105 may be used to implement actions received from the server. For example, the security module 105 may be able to lock out access to some or all functionalities of the user device, to limit the vulnerabilities detected, to provide notifications to the user about required updates, to delete data, and to lock the user device itself. Other actions are possible.

User device 102 communicates with server 104 via network 103. Network 103 can be any type of network, including a local area network (LAN), a wide area network (WAN), the Internet, or a virtual private network (VPN).

Server 104 includes at least some of the components of example computing device shown and described with reference to FIG. 7, below. In embodiments, the server 104 may operate over distributed systems (e.g., cloud-based computing systems), where application functionality, memory, data storage and retrieval and various processing functions may be operated remotely from each other over a distributed computing network, such as the Internet or an intranet.

Server 104 also hosts threat manager 106. Generally, threat manager 106 receives identified threats, monitors and/or receives user activity, and conducts security actions. Data used by, and created by, threat manager 106 and its modules are stored in one or more databases accessible by server 104. An exemplary method 200 implemented by the threat manager 106 is shown and described in more detail below with reference to FIG. 3.

Figure 2:
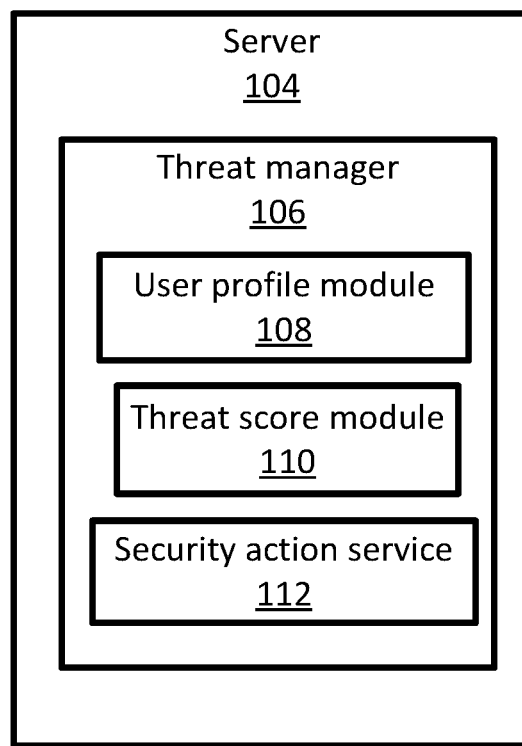
FIG. 2 is a block diagram illustrating components of the example server of FIG. 1.

FIG. 2 is a block diagram illustrating components of the example threat manager 106. In the embodiment shown, the example threat manager 106 includes a user profile module 108, a threat score module 110, and a security action service.

As mentioned above, the threat manager is hosted on the server 104. Other embodiments can include more or fewer components.

User profile module 108 generates a ranking for one or more users and/or user devices 102 within the enterprise. The user profile module 108 may generate user profiles on demand, such as when requested by the threat manager 106 based on a particular vulnerability. Based on the profiles of the user and/or user devices, the user profile module 108 determines a risk score. Example methods of building a user profile are described below in more detail at least with reference to FIGS. 3-6.

Threat score module 110 generates a threat score based on one or more inputs. The inputs include publicly available information, such as the National Vulnerability Database (sponsored by the National Institute of Standards and Technology), the Common Vulnerabilities and Exposures (CVE), and the Common Weakness Enumeration (CWE). The inputs also include non-public information, such as assessments from private third parties as well as information regarding the enterprises' networks and devices used within those networks. Example methods of generating a threat score are described below in more detail at least with reference to FIGS. 3-6.

Security action service 112 implements one or more security actions within the enterprise. The example security action service 112 may, for example, monitor deadlines, receive security updates, and monitor and enforce user compliance. Example methods of implementing security actions are described below in more detail at least with reference to FIGS. 3-6.

Figure 3:
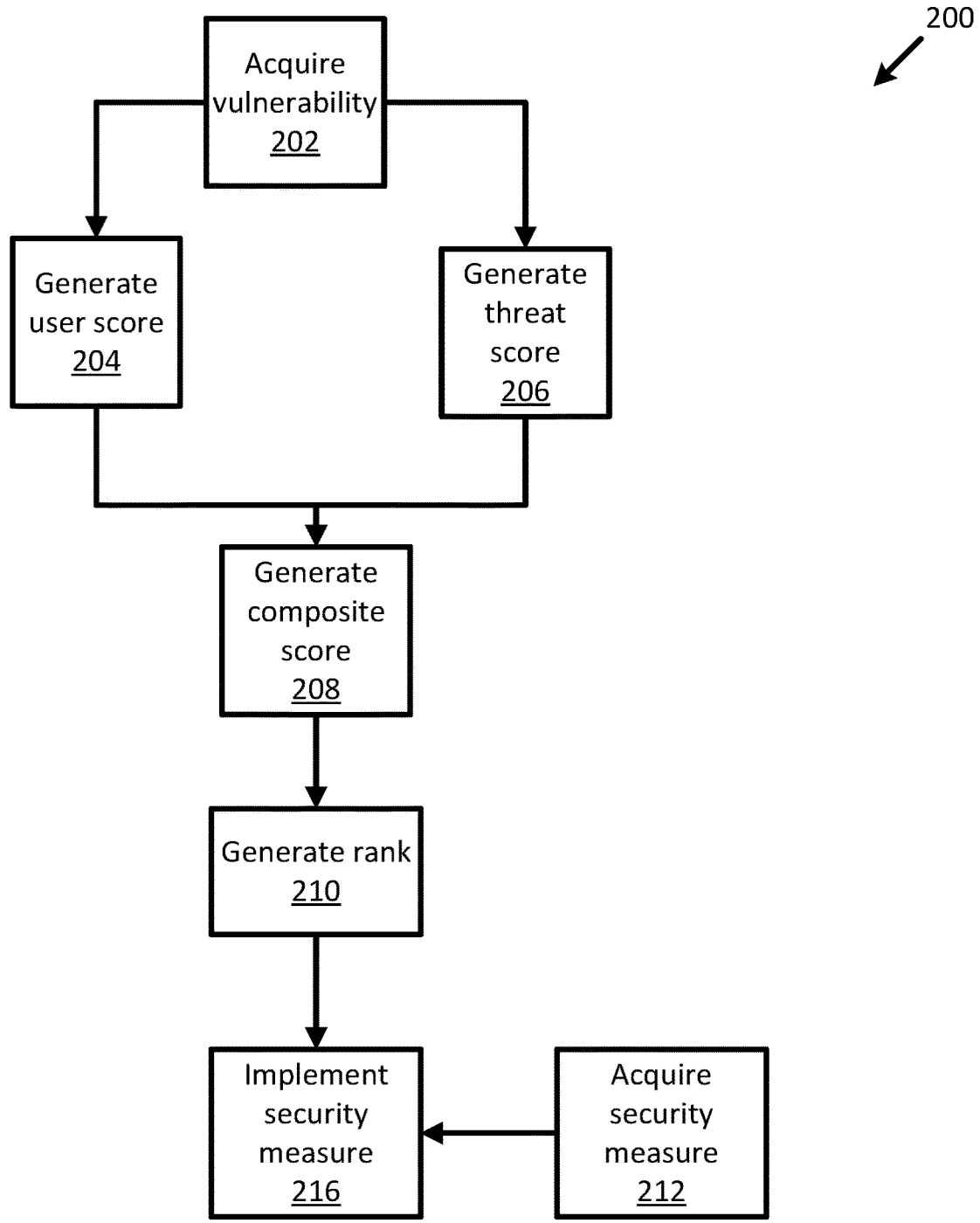
FIG. 3 is an example method for managing a security risk in an enterprise.
Figure 4:
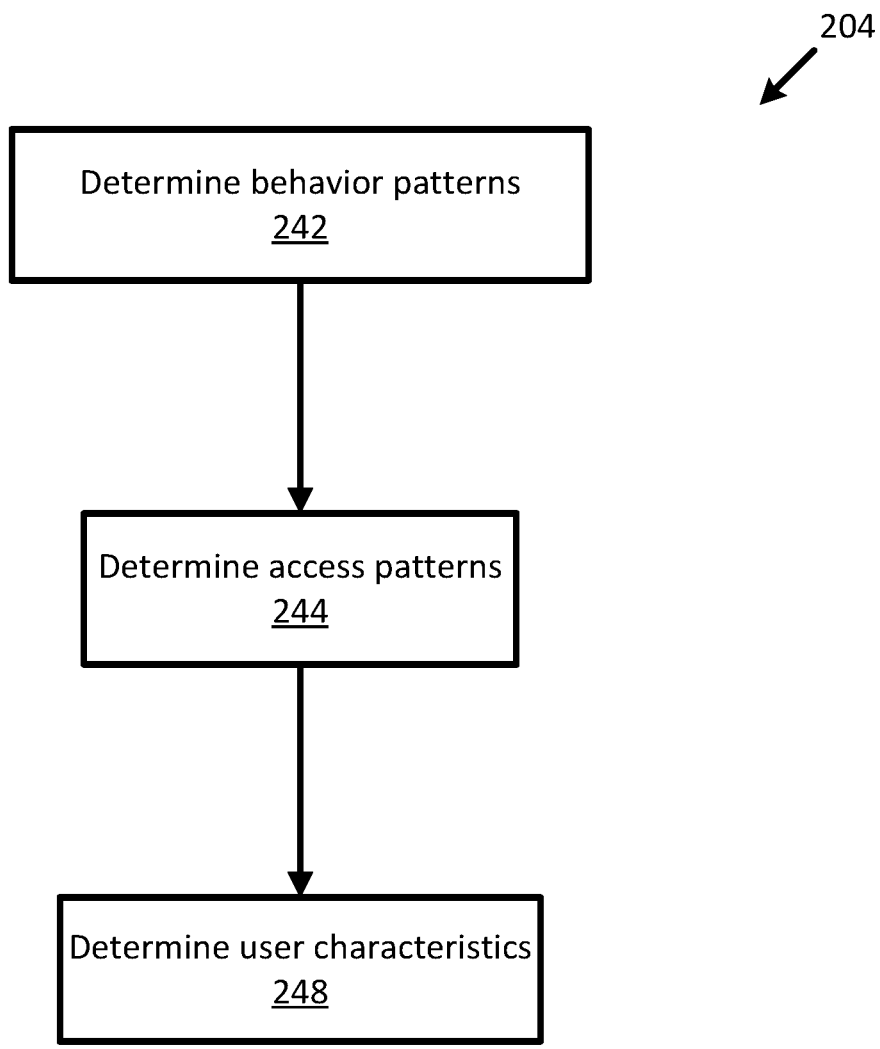
FIG. 4 is an example method of the generating a user score per the method of FIG. 3.
Figure 5:
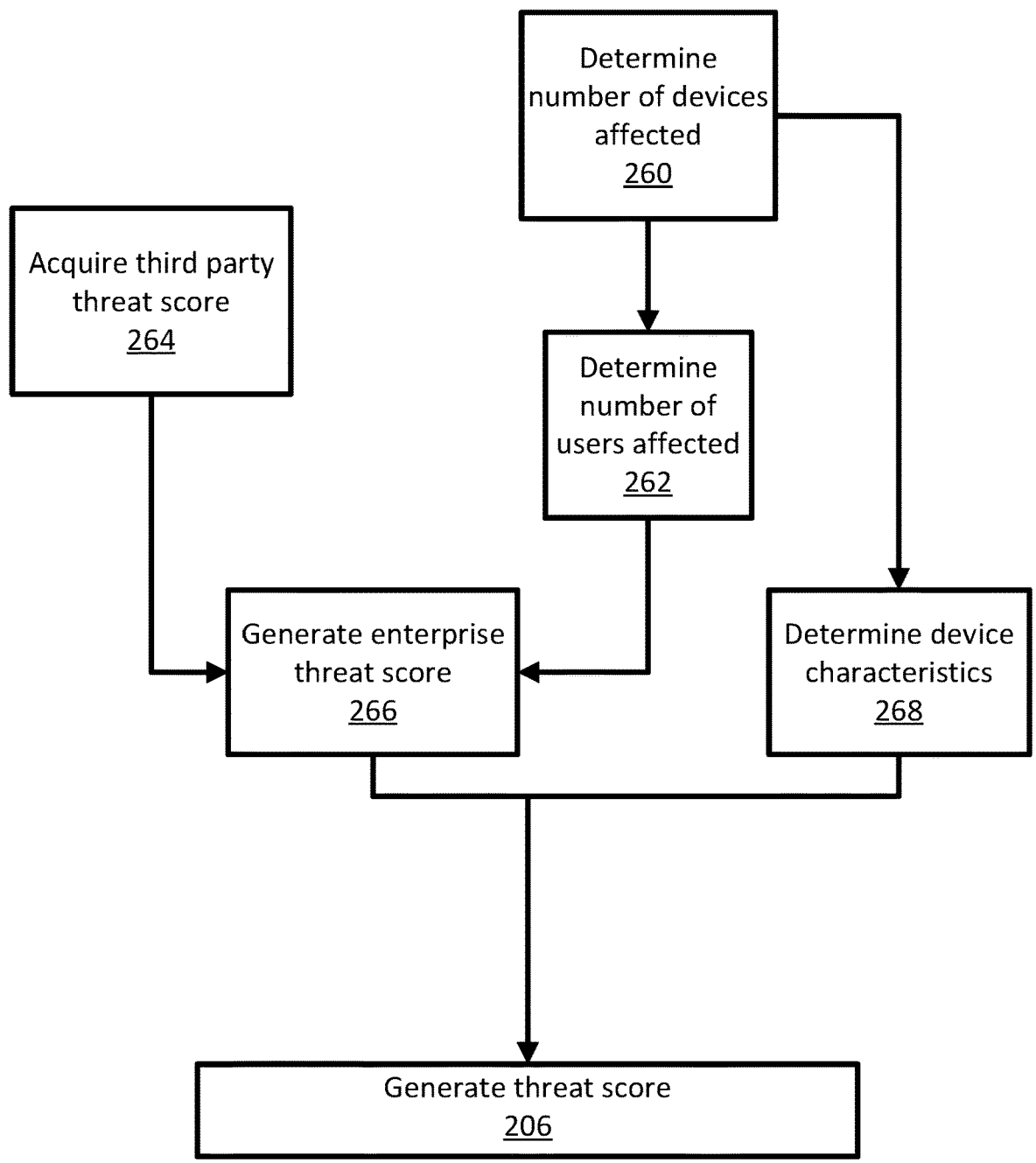
FIG. 5 is an example method of the generating a threat score per the method of FIG. 3.

FIG. 3 illustrates an embodiment of an example method 200 for implementing security actions in an enterprise. The example method 200 includes acquiring a vulnerability (operation 202), generating a user score (operation 204), generating a threat score (operation 206), generating a composite score (operation 208), generating a ranking (operation 210), receiving a security measure (operation 212), determining a security measure and a priority (operation 214), and implementing a security measure (operation 216). Other embodiments may include more or fewer operations.

The example method 200 begins by acquiring a vulnerability (operation 202). As mentioned above, vulnerabilities include weaknesses of, for example, operating systems, firmware, particular software applications, and the like. The vulnerability may be publicly announced or privately identified by the enterprise. In some embodiments, the vulnerability is acquired manually, such as when an enterprise-specific cyber threat team member identifying the vulnerability or a risk is identified on a public news channel. In some embodiments, the vulnerability is acquired automatically, such as when a vulnerability is received from a third party vendor or governmental agency.

The person or persons receiving the vulnerability log the vulnerability in a database. When the vulnerability is automatically received, the vulnerability is automatically logged in a database. The database log may include data about the vulnerability, such as source, date received, devices or software affected, etc. Other data are possible.

After acquiring a vulnerability (operation 202), a user score is generated (operation 204). Generally, the user score reflects the relative priority of the user in receiving a particular patch or remedy. Generating a user score (operation 204) is shown in greater detail in FIG. 4 and includes determining behavior patterns (operation 242), determining access patterns (operation 244), and determining user characteristics (operation 248). In embodiments, the user score generation may also include characteristics of the user's devices (operation 268), which is shown and described in more detail with reference to FIG. 5. Other embodiments may be performed in a different order, and other embodiments may include more or fewer operations.

Determining user behavior patterns (operation 242) includes an analysis of various activities by the user across all devices associated with the user. Determining behavior patterns (operation 242) may result in the generation of a score associated with the user behavior. The user behavior score may be proactively determined for all users. The proactive determination may be continually updated or updated on a regular basis, such as daily, weekly, monthly, or yearly. The user behavior score may be reactively determined based on either the vulnerability notification or suspect activity by the user.

Types of user behavior considered during operation 242 may include one or more of the following: visits to blocked web addresses, a volume of junk mail in the user's enterprise email account, any previous virus or malware infections, a volume of phishing or spearphishing emails received by the user's enterprise email account, the software that is installed on the user device(s) including the type of software (illicit activities, gambling, etc.), and responses to tests (e.g., sending a fake email to test the user). Other considerations are possible.

Generating a user score (operation 204) also includes determining a user's access patterns (operation 244). Examples of access patterns considered include: the number of different devices the user uses for access, access and flow patterns for system access (such as time of day access, locations where data are accessed), frequency of data access, and attempts to access data that are not the usual set of data that the user accesses or should access. Other considerations are possible.

Generating a user score (operation 205) also includes determining user characteristics (operation 248). User characteristics include, for example, one or more of the following: position of the user within the enterprise (e.g., C-level executive, middle manager, board member, etc.), level of seniority of the user within the enterprise, and access clearance of the user. Other considerations are possible.

The generated user score from operation 204 may take a variety of forms. In one embodiment, the user score is represented by an n-dimensional vector of behavior patterns, access/data patterns, user device characteristics, and user characteristics, i.e., where each dimension tracks a different characteristic. The dimensions in the vector may be weighted and summed to produce a score.

In other embodiments, different sets of dimensions may be used for different types of users (e.g., a bank teller versus an executive). In still other embodiments, the same dimensions are used but they are weighted. In some instances, the same dimensions are used without weighting and the system provides a notification that values of some dimensions may be quite different for different users. In some instances, the vulnerability affects systems within the enterprise that are not directly associated with users, such as back-end servers. In those embodiments, the user score is generated considering the data type and access types of those systems, and, optionally, the types of users affected by those systems.

Referring again to FIG. 3, a threat score is also generated (operation 206) after receiving the vulnerability (operation 202). Generating a threat score (operation 206) is shown in greater detail in FIG. 5 and includes determining a number of devices affected (operation 260), determining a number of users affected (operation 262), acquiring a third party threat score (operation 264), generating an enterprise threat score (operation 266), and determining device characteristics (operation 268).

Generating an enterprise threat score (operation 266) includes determining the number of devices affected (operation 260). A given vulnerability may only affect smart phones with a particular operating system, such as smart phones with the BlackBerry™ operating system. Determining the number of devices affected (operation 260) includes identifying what the vulnerability affects and then calculating the number of devices within the enterprise that have an operating system, software, firmware, etc., that would be potentially impacted by the vulnerability. By identifying the types of devices affected, and by knowing the number of each type of device used within the enterprise, the number of devices within the enterprise affected by the vulnerability can be determined.

After determining the number of devices affected (operation 260), the number of users affected is determined (operation 262). As mentioned above, users within the enterprise may be associated with multiple user devices. Based on the number and types of devices affected, the system can determine the number of users affected (operation 262).

Generating an enterprise threat score (operation 266) may also include acquiring a third party threat score (operation 264). The third party threat score may be acquired from a public database, such as the NIST or CVE, or from a private party, such as a vendor specializing in mobile device management (MDM).

Generating an enterprise threat score (operation 266) may additionally include determining device characteristics (operation 268). Determining device characteristics (operation 268) may include generating a score for each user device or a composite score including all devices in the enterprise.

Device characteristics include, for example, one or more of the following: the type of machine (e.g., smart phone, tablet computer, desktop computer, etc.), the type of networks accessible by the user device (e.g., enterprise intranet, Internet, etc.), the sensitivity of data or processes handled by the user device, what the vulnerability does to the computing device (e.g., siphon data, request a ransom payment, etc.), system or device-level importance, regulated/non-regulated (e.g., Sarbanes-Oxley) status of the device, whether the device is background or a user device, and the internal- or internet-facing status of the device. Other considerations are possible.

After generating a user score (operation 204) and/or a threat score (operation 206), a composite score is generated (operation 208). The composite score may be generated for one or more of: the entire enterprise, a score for each user, and a score for each user device or system. Generating the composite score (operation 208) may include using more than the user score and the threat score in the calculation. For example, generating the composite score (operation 208) may include and apply weights to the user score, the threat score, the user status, and the number of devices affected. Other combinations are possible.

Based on generating composite scores (operation 208), rankings are generated (operation 210). For example, generating a ranking (operation 210) may include ranking the user devices in the enterprise, ranking the users within the enterprise, and/or ranking the systems within the enterprise. These rankings may be in order from low priority to high priority, or low risk to high risk, where the ranking is based on the composite score and/or the user score. Thereby, a score for a user and/or user device may be blended with the threat score to determine a per-threat, per-user, and/or per-user device prioritization of security measures.

At some point during the example method 200, a security measure is acquired (operation 212). The security measure may be a security patch or some type of hardware or software update. In some embodiments, the security measure may be an action such as blocking ports, limiting access to software or operating system functions, and the like. The security measure may be generated in-house or obtained from a third party. If no patch or remedy is available, then mitigation or acceptance documentation and actions may be prepared.

Figure 6:
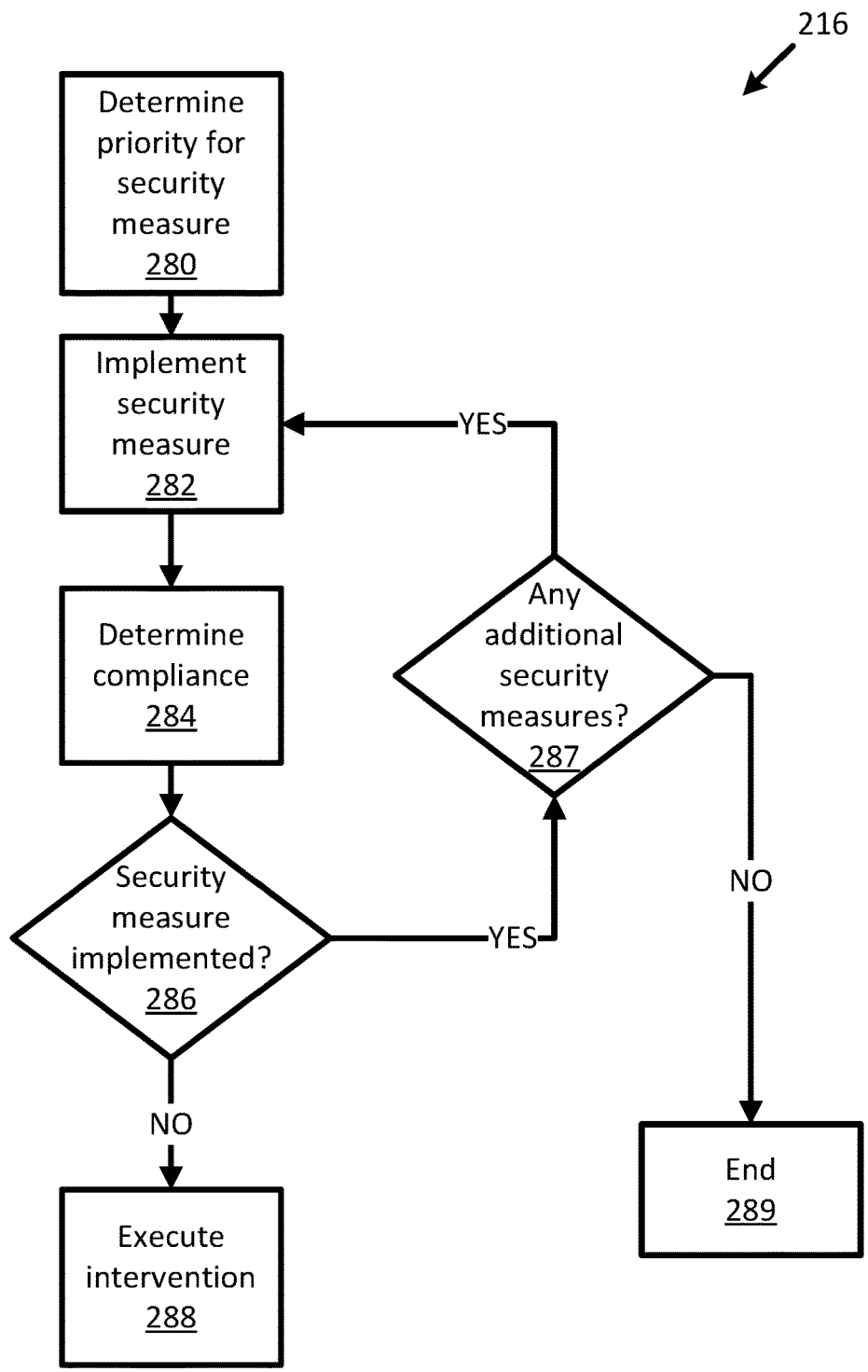
FIG. 6 is an example method of the security measure per the method of FIG. 3.

After acquiring the security measure (operation 212) and generating a ranking (operation 210), the security measure is implemented (operation 216). Referring now to FIG. 6, implementing a security measure (operation 216) includes determining priority for the patch (operation 280), publishing the patch (operation 282), determining compliance (operation 284), determining whether the security measure has been implemented (operation 286), and executing device intervention (operation 288). Other embodiments may include more or fewer operations.

Based on the rankings generated (operation 210), a priority for the security measure and for the implementation is generated (operation 280). In some instances, the enterprise only has one security measure at the time to roll out to systems, devices, and users. In those instances, no prioritization among security threats must be addressed. Alternatively, there may be more than one security threat identified. In those instances, the threat score and/or the composite score may be used to prioritize the order in which the available security measures are implemented. For a particular security measure, rollout of the security measure follows the ranking or rankings generated during operation 210. In some embodiments, users with high priority on lower threat scores could be prioritized ahead of users with low priority on higher threat scores. In this manner, the system may resolve security threats at least in part at the enterprise level but resolve prioritization of the rollout of security measures at the user level.

Next, the security measure is implemented (operation 282). In some embodiments, implementing the security measure includes publishing a patch or software update. Implementing a security measure (operation 282) may also include providing automated notifications to users impacted by a particular security threat with indications of what needs to be fixed, e.g., threat mitigation steps that may include installation of a patch, manual steps to take, scripts to run, or other user actions. Additionally, the notifications may indicate the relative urgency of taking the security actions.

After implementing the security measure across the enterprise (operation 282), user compliance is determined (operation 284). Determining user compliance may include creating an adoption/non-compliant user list for the particular security measure. If the security measure has been implemented (operation 286), then the method 200 determines whether any additional security measures need to be implemented for the user or user devices (operation 287). If there are no additional security measures, the method 200 ends (operation 289).

If the security measure has not been implemented (operation 286), then subsequent intervention steps are executed (operation 288). Intervention steps include sending one or more communications reminding the user about the security measure and any deadlines for action and sending a final communication regarding compliance.

Some intervention steps may communicate with the security module on the user device to limit, restrict, or disable features and access to enterprise data and/or the device itself. These degradations in user device service may occur gradually or all at once. As an example, first the enterprise-specific applications on the user device are disabled. Then, if a user does not implement the security measure, the enterprise email associated with the user is disabled. Then, if a user still does not implement the security measure, the user device is removed from the system. Last, the user device may be completely wiped of all data.

As an example, the user may have a first predetermined time period within which to implement the security measure. If the user fails to perform the update within that first predetermined time period, device access or capabilities are limited. For example, the security module on the user device may be activated to lock out the functionality affected by the identified security threat. In some embodiments, the user may be given an additional second predetermined time period to update the user device. If the user fails to implement the necessary security measures within the second predetermined time period, then the user device may be locked out of accessing enterprise-specific data and/or applications.

Figure 7:
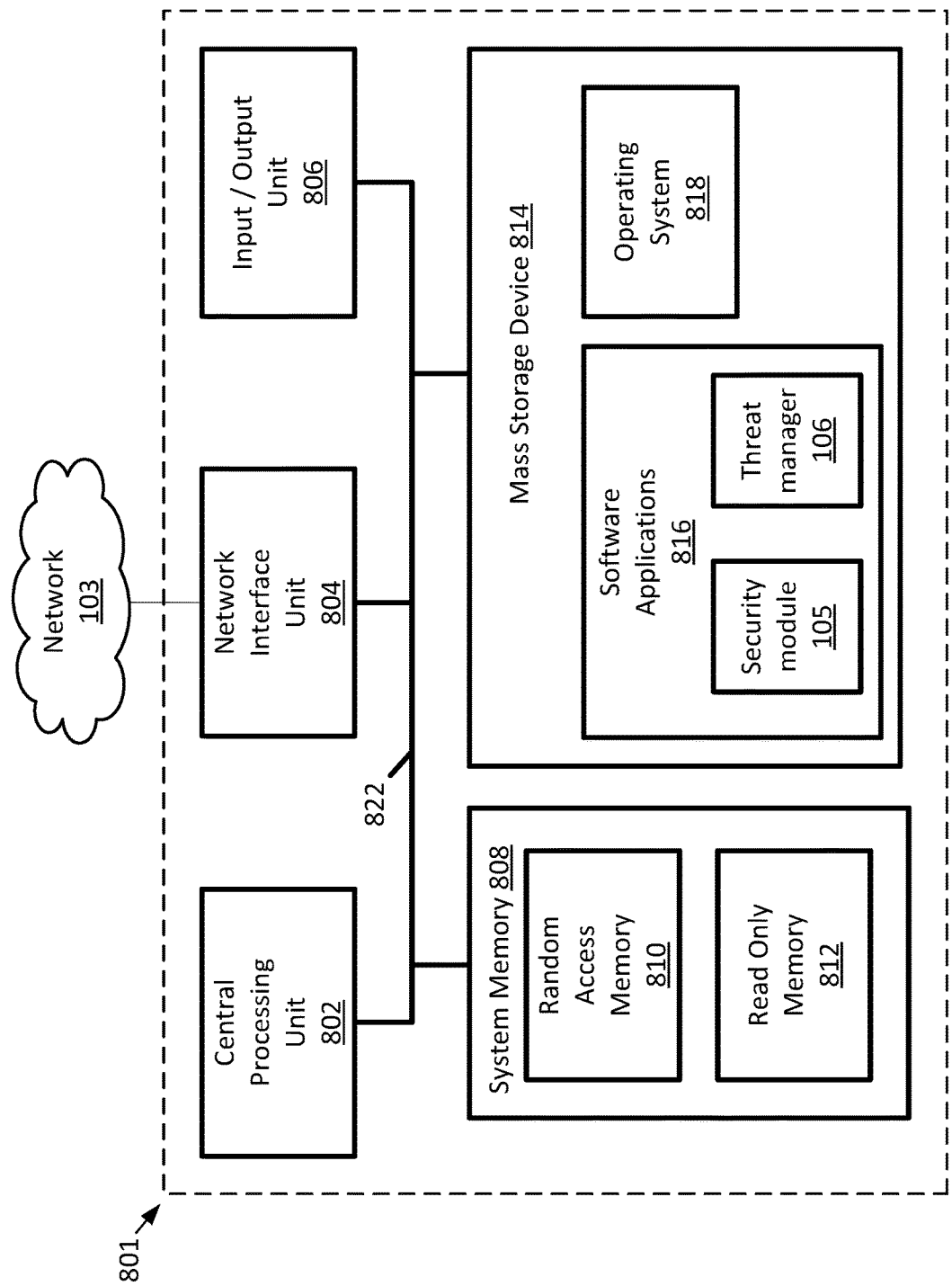
FIG. 7 shows example physical components of a computing device hosting the security module and the threat manager of the computing system of FIG. 1.

FIG. 7 shows an example computing device 801 hosting software applications 816 including threat manager 106 and/or security module 105. As illustrated, the example computing device 801 includes at least one central processing unit ("CPU") 802, a system memory 808, and a system bus 822 that couples the system memory 808 to the CPU 802. The system memory 808 includes a random access memory ("RAM") 810 and a read-only memory ("ROM") 812. A basic input/output system that contains the basic routines that help to transfer information between elements within the example computing device 801, such as during startup, is stored in the ROM 812. The example computing device 801 further includes a mass storage device 814. The mass storage device 814 is able to store software instructions and data.

The mass storage device 814 is connected to the CPU 802 through a mass storage controller (not shown) connected to the system bus 822. The mass storage device 814 and its associated computer-readable data storage media provide non-volatile, non-transitory storage for the example computing device 801. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the example computing device 801.

According to various embodiments of the invention, the example computing device 801 may operate in a networked environment using logical connections to remote network devices through the network 103, such as a wireless network, the Internet, or another type of network. The example computing device 801 may connect to the network 103 through a network interface unit 804 connected to the system bus 822. It should be appreciated that the network interface unit 804 may also be utilized to connect to other types of networks and remote computing systems. The example computing device 801 also includes an input/output controller 806 for receiving and processing input from a number of other devices, including a touch user interface display screen, or another type of input device. Similarly, the input/output controller 806 may provide output to a touch user interface display screen or other type of output device.

As mentioned briefly above, the mass storage device 814 and the RAM 810 of the example computing device 801 can store software instructions and data. The software instructions include an operating system 818 suitable for controlling the operation of the example computing device 801. The mass storage device 814 and/or the RAM 810 also store software instructions, that when executed by the CPU 802, cause the example computing device 801 to provide the functionality of the example computing device 801 discussed in this document. For example, the mass storage device 814 and/or the RAM 810 can store software instructions that, when executed by the CPU 802, cause the example computing device 801 to display received data on the display screen of the example computing device 801.

Although various embodiments are described herein, those of ordinary skill in the art will understand that many modifications may be made thereto within the scope of the present disclosure. Accordingly, it is not intended that the scope of the disclosure in any way be limited by the examples provided.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

The invention claimed is:

1. An electronic computing device, comprising:
a processing unit; and
system memory, the system memory including instructions that, when executed by the processing unit, cause the electronic computing device to:
generate a user score for at least one of a plurality of users of computing devices, the user score being based upon behavioral data including behavioral patterns and access patterns of the at least one of the plurality of users;
determine a number of the computing devices affected by a vulnerability;
determine, based on the number of the computing devices and types of the computing devices affected by the vulnerability, a number of the plurality of users affected by the vulnerability;
based on the user score and the number of the plurality of users, determine a sequence of priority of distribution of remediation for the computing devices associated with the plurality of users; and
sequentially implement remediation for the computing devices, including to implement remediation for one of the computing devices after implementing remediation for another of the computing devices, based on the sequence of priority.

2. The electronic computing device of claim 1, wherein the instructions, when executed by the processing unit, cause the electronic computing device to:
generate a user score for each of the plurality of users of the computing devices based upon behavioral data including behavioral patterns and access patterns of all of the plurality of users,
wherein the sequence of the priority of distribution of remediation is based on all of the user scores.

3. The electronic computing device of claim 1, wherein the remediation includes publishing a security patch.

4. The electronic computing device of claim 3, wherein the publishing the security patch includes sending a reminder to update after a predetermined period of time.

5. The electronic computing device of claim 1, wherein the behavioral data includes at least one of: a type of a user device associated with the at least one of the plurality of users and a type of processes used by the user device associated with the at least one of the plurality of users.

6. The electronic computing device of claim 1, wherein the behavioral data includes at least one of: a corporate rank of the at least one of the plurality of users and a system access level for the at least one of the plurality of users.

7. The electronic computing device of claim 1,
wherein the behavioral patterns include at least one of the following: a browsing history of the at least one of the plurality of users, a volume of junkmail, a previous computing device infection, a volume of phishing email; and
wherein the access patterns include at least one of the following: a quantity of unique devices used by the at least one of the plurality of users to access enterprise-related data, and an access pattern of the at least one of the plurality of users including time of day.

8. The electronic computing device of claim 1, wherein the instructions, when executed by the processing unit, cause the electronic computing device to:
activate a security module to lock out a device capability of a computing device associated with the at least one of the plurality of users if the at least one of the plurality of users does not perform the remediation within a first predetermined time period.

9. The electronic computing device of claim 8, wherein the instructions, when executed by the processing unit, cause the electronic computing device to:
deactivate access to data if the at least one of the plurality of users does not perform the remediation within a second predetermined time period.

10. The electronic computing device of claim 1, wherein the instructions, when executed by the processing unit, cause the electronic computing device to:

determine compliance of the at least one of the plurality of users with the implemented remediation; and implement, based on the compliance, an additional security measure.

11. A computer-implemented method, comprising:

generating a user score for at least one of a plurality of users of computing devices, the user score being based upon behavioral data including behavioral patterns and access patterns of the at least one of the plurality of users;

determining a number of the computing devices affected by a vulnerability;

determining, based on the number of the computing devices and types of the computing devices affected by the vulnerability, a number of the plurality of users affected by the vulnerability;

determining, based on the user score and the number of the plurality of users, a sequence of priority of distribution of remediation for the computing devices associated with the plurality of users; and sequentially implementing remediation for the computing devices, including implementing remediation for one of the computing devices after implementing remediation for another of the computing devices, based on the sequence of priority.

12. The computer-implemented method of claim 11, further comprising:

generating a user score for each of the plurality of users of the computing devices based upon behavioral data including behavioral patterns and access patterns of all of the plurality of users, wherein the sequence of the priority of distribution of remediation is based on all of the user scores.

13. The computer-implemented method of claim 11, wherein the remediation includes publishing a security patch.

14. The computer-implemented method of claim 13, wherein the publishing the security patch includes sending a reminder to update after a predetermined period of time.

15. The computer-implemented method of claim 11, wherein the behavioral data includes at least one of: a type of a user device associated with the at least one of the plurality of users and a type of processes used by the user device associated with the at least one of the plurality of users.

16. The computer-implemented method of claim 11, wherein the behavioral data includes at least one of: a corporate rank of the at least one of the plurality of users and a system access level for the at least one of the plurality of users.

17. The computer-implemented method of claim 11, wherein the behavioral patterns include at least one of the following: a browsing history of the at least one of the plurality of users, a volume of junkmail, a previous computing device infection, a volume of phishing email; and wherein the access patterns include at least one of the following: a quantity of unique devices used by the at least one of the plurality of users to access enterprise-related data, and an access pattern of the at least one of the plurality of users including time of day.

18. The computer-implemented method of claim 11, further comprising:

activating a security module to lock out a device capability of a computing device associated with the at least one of the plurality of users if the at least one of the plurality of users does not perform the remediation within a first predetermined time period.

19. The computer-implemented method of claim 18, further comprising:

deactivating access to data if the at least one of the plurality of users does not perform the remediation within a second predetermined time period.

20. The computer-implemented method of claim 11, further comprising:

determining compliance of the at least one of the plurality of users with the implemented remediation; and implementing, based on the compliance, an additional security measure.

* * * * *